United States Patent [19]
Raikov et al.

[11] 3,870,433
[45] Mar. 11, 1975

[54] WORM PUMP

[76] Inventors: Ivan Yakovlevich Raikov, ulitsa B. Galushkina; Pavel Andreevich Ivaschenko, ulitsa Glebovskaya 4, kv. 51; Igor Vasilievich Samoilovsky, ulitsa B. Spasskava 1/2 korpus 2, kv. 9, all of Moscow, U.S.S.R.

[22] Filed: Aug. 30, 1973

[21] Appl. No.: 393,137

[52] U.S. Cl. .................................. 415/72
[51] Int. Cl. ................................. F01d 5/00
[58] Field of Search ...................... 415/72

[56] References Cited
UNITED STATES PATENTS
3,355,766  12/1967  Causemann ........................ 415/72

FOREIGN PATENTS OR APPLICATIONS
260,418  0/1970  U.S.S.R. .............................. 415/72
349,492  0/1960  Switzerland ......................... 415/72

*Primary Examiner*—C. J. Husar

[57] ABSTRACT

A worm pump has a screw conveyer with a screw groove, whose hydraulic diameter does not exceed 0.5 mm, and the ratio between its width and depth is from 1 to 4.

The output of the pump practically does not depend on the fluid viscosity and its change in the course of the pump operation.

1 Claim, 4 Drawing Figures

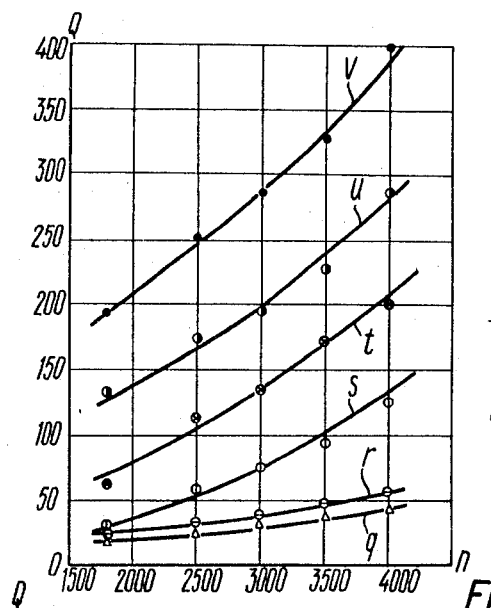
FIG.2
FIG.1
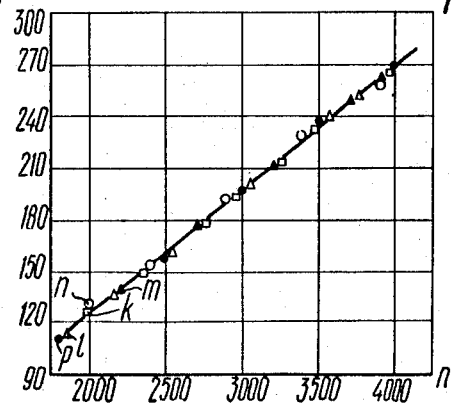
FIG.4
FIG.3

WORM PUMP

The present invention relates to means used for pumping fluid and, more particularly, to worm pumps.

The present invention can find use in various branches of machine and aircraft building wherever it is necessary to provide a relatively small fluid supply, for instance, for lubricating various units of machines when the viscosity of the fluid being pumped changes in the course of operation owing to its heating and other reasons.

The present invention is most successfully used in the lubricating systems of machine-tools and for oil supply in two-cycle carburetor internal combustion engines.

Known are worm pumps comprising a body with a port for accommodation therein of a screw conveyer whose side face is provided with at least one screw groove, and two ducts extending from the port in the body and disposed near the butt ends of the screw conveyer, of which ducts one communicates the port with the source of the fluid being pump and the other one with the consumer.

The conventional worm pumps are of the friction type. The port in the body, accomodating the screw conveyer, has a smooth side surface, and the fluid getting into the screw grooves of the screw conveyer is taken up by it and is pumped over to the consumer.

Worm pumps are used, for example, as labyrinth packings of the shafts of internal combustion engines of the piston and gas-turbine types. For this reason the screw groove is made 1–2 mm deep and 2–4 mm wide. It is cut directly on the shaft of the engine to prevent oil leakage from its inner cavities. Worm pumps are used as auxiliary ones in metal-cutting machine-tools, gear boxes of automobiles and in other machines.

In this case the cross-section of the groove is chosen so as to obtain the most advantageous cross section from the viewpoint of hydraulics, that would have the maximum hydraulic diameter determined by the ratio between the four-fold area of the groove cross-section and its perimeter being wettened.

The main disadvantage of conventional worm pumps lies in that the ratio between the depth and the width of the screw groove on the screw conveyer and its hydraulic diameter lie in them within such ranges, when the forces of friction between the fluid particles and the material of the body and the screw determine the pump operation. The friction forces, in turn, depend on the viscosity of the fluid being pumped. This viscosity may change in the course of operation, as a result of which the amount of the fluid supplied per time unit is changed too.

This phenomenon is especially undesirable in the cases when the amount of the fluid being supplied is relatively small as is the case in the lubricating systems of machines, and any deviations from the nominal value of supply may lead to deteriorations of the machine as a whole.

An object of the present invention lies in provision of such a worm pump that would ensure a stable value of the fluid supply per time unit irrespective of the viscosity of the fluid being pumped.

This and other objects are accomplished by a worm pump comprising a body with a port for accommodation therein of a screw conveyer whose side face is provided with at least one screw groove, and two ducts extending from the port in the body and disposed near the butt ends of the screw conveyer, of which ducts one communicates the port with the source of the fluid being pumped and the other one with the consumer.

In accordance with the invention the screw conveyer has a hydraulic diameter of up to 0.5 mm and the ratio between its width and depth is from 1 to 4.

This embodiment of the screw groove allows to decrease substantially the effect exercised by the friction forces on the pump operation and to eliminate the dependence between the amount of the fluid supplied per time unit and the viscosity of the fluid being pumped.

The following detailed description of an exemplary embodiment of the present invention is given with reference to the accompanying drawings, in which:

FIG. 1 shows schematically a worm pump according to the invention, with a longitudinal section taken along the axis of the screw conveyer;

FIG. 2 is an enlarged view of point II in FIG. 1;

FIG. 3 is a diagram showing dependence of the amount of the fluid of various viscosity supplied per time unit by the worm pump according to the invention upon the number of revolutions of the screw conveyer.

FIG. 4 is a diagram showing dependence of the amount of the fluid of various viscosity supplied per time unit by a conventional worm pump upon the number of revolutions of the screw conveyer.

The worm pump has a body 1 (FIG. 1) with a cylindrical port 2 for accommodation therein of a screw conveyer 3. The side face of the port 2 is made smooth.

In the present example, there is considered the screw conveyer 3 with one screw groove 4 provided on the side face thereof, i.e., the screw conveyer 3 is single-threaded. Extending from the port 2 near the butt ends of the screw conveyer 3 are two ducts 5 and 6, the duct 5 communicating the port 2 with the source 7 of the fluid being pumped, and the duct 6 serving for delivery of the fluid to the consumer.

The screw conveyer 3 has a shank 8 disposed in to seal 9 and extending beyond the body 1 to be connected to the drive of the pump. Mounted between the first (as seen in the drawing) butt end of the screw conveyer 3 and the seal 9 is an annular washer 10. The seal 9 is secured in the body 1 with the aid of a locking ring 11. The screw groove 4 (FIG. 2) of the screw conveyer 3 is of a rectangular cross section, whose depth $h$ and width $b$ are chosen so that the ratio $b/h$ varies from 1 4, the hydraulic diameter D of the groove 4, measured by the ratio of the four-fold area F of its cross-section and the perimeter II of the cross-section, being wettened, i.e., $D = 4F/II$, not exceeding 0.5 mm.

With the screw groove 4 having these parameters, the amount of the fluid supplied per time unit practically does not depend i.e., the output of the worm pump on the viscosity of the fluid being pumped and the length of the screw conveyer 3. This is explained by the fact that the groove 4 having the above-mentioned parameters becomes almost a capillary slit in which the fluid flow is determined by its adhesion to the material from which the body 1 and the screw conveyer 3 are made, i.e., prevailing here are the forces of the molecular adhesion between the fluid and the material from which these parts are made. The value of the forces does not vary upon a change in the fluid viscosity.

Given below is a comparative table from which it follows that the worm pump having the groove 4 provided on the screw conveyer 3 of the above parameters has much smaller values of deviation of the output from the rated value in the case of a change in the viscosity of the fluid being pumped.

| Hydraulic diameter D, in mm | b/h | Limits of Change of Viscosity of fluid, in cSt | Change in fluid amount supplied in % from its amount in case of fluid minimal viscosity |
|---|---|---|---|
| 0.88 | 1.7 | 43–827 | 800 |
| 0.33 | 5 | 3–830 | 50 |
| 0.177 | 8 | 3–830 | 40 |
| 0.3–0.4 | 3–2 | 3–830 | 1.0 |
| 0.43 | 2.6 | 3–830 | 6.0 |
| 0.506 | 2.2 | 3–830 | 8–10 |

FIG. 3 shows a diagram of dependence of the amount of fluid supplied per time unit Q cm³/hr of various viscosity by the pump according to the present invention upon the number of revolutions $n$ (rpm) of the screw conveyer 3. In the diagram the points $k, l, m, n, p$ correspond to the fluids of the viscosity of 833, 229, 43, 8–10.3 cSt. It is also seen from the diagram that the output of the pump practically does not depend upon the fluid viscosity. The data for the diagram were obtained in the course of testing the worm pump with the screw conveyer 3 having the diameter $d = 12$ mm, the length of the threaded portion $l = 23$ mm, and the ratio $b/h = 3$.

The fluid viscosity varied from 3 to 833 cSt.

To compare it to conventional worm pumps, FIG. 4 gives a diagram of dependence of the output Q cm³/hr of the pump upon the number of revolutions of the screw conveyer 3 (rpm). In the diagram the curves $q, r, s, t, u, v$ correspond to the fluids of the viscosity of 43, 74, 121, 228, 491, 827 cSt. The data for the diagram were obtained during operation of the pump with the screw conveyer having the diameter $d = 8$ mm, the length of the threaded portion $l = 22$ mm, $b = 1.2$ mm and $h = 0.7$ mm.

It is seen from FIG. 4 that the output of the pump Q cm³/hr varies substantially upon a change in the fluid viscosity.

Thus, the worm pump according to the present invention can be used for pumping fluids of various viscosity or under conditions when the fluid viscosity changes in the course of the pump operation because of heating or some other reasons.

The operation of the pump according to the present invention does not differ from that of conventional worm pumps.

By varying the number of the grooves 4 on the side face of the screw conveyer 3 it is possible to provide a pump of a preset output and pumping pressure.

What we claim is:

1. A worm pump comprising a body having a port; a screw conveyer disposed in said port of said body, said screw conveyor having a side face with at least one screw groove; two ducts extending from said port in the said body and disposed near the butt ends of said screw conveyor, one of said ducts communicating said port in said body with the source of the fluid being pumped, and the other duct communicating with the consumer; a screw groove made in the said screw conveyer, whose hydraulic diameter is less than 0.5 mm, said screw groove in said screw conveyer having the ratio between its width and depth ranging from 1 to 4, said hydraulic diameter being the ratio of four times the cross-sectional area divided by the wetted perimeter of the cross-section.

* * * * *